United States Patent
Guilloux et al.

(10) Patent No.: US 8,128,226 B2
(45) Date of Patent: Mar. 6, 2012

(54) METHOD FOR THE DETERMINATION OF A PROGRESSIVE OPHTHALMIC LENS

(75) Inventors: Cyril Guilloux, Paris (FR); Diane De Gaudemaris, Paris (FR); Marie-Anne Berthezene, Maison-Alfort (FR); Céline Carimalo, Singapore (SG)

(73) Assignee: Essilor International (Compagnie Generale d'Optique), Cedex (FR)

( * ) Notice: Subject to any disclaimer, the term of this patent is extended or adjusted under 35 U.S.C. 154(b) by 212 days.

(21) Appl. No.: 11/679,372

(22) Filed: Feb. 27, 2007

(65) Prior Publication Data
US 2007/0242220 A1 Oct. 18, 2007

(30) Foreign Application Priority Data
Mar. 1, 2006 (FR) ................................. 06 01810

(51) Int. Cl.
*G02C 7/02* (2006.01)
(52) U.S. Cl. ....................... 351/177; 351/159
(58) Field of Classification Search .................. 351/177
See application file for complete search history.

(56) References Cited

U.S. PATENT DOCUMENTS

| | | |
|---|---|---|
| 5,270,745 A | 12/1993 | Pedrono |
| 5,272,495 A | 12/1993 | Pedrono |
| 5,333,412 A | 8/1994 | Matsuyama |
| 5,444,503 A | 8/1995 | Kelch et al. |
| 5,488,442 A | 1/1996 | Harsigny et al. |
| 6,199,983 B1 | 3/2001 | Kato et al. |
| 6,222,621 B1 * | 4/2001 | Taguchi ........................ 356/124 |
| 6,318,859 B1 | 11/2001 | Baudart et al. |
| 6,382,789 B1 | 5/2002 | Baudart et al. |
| 6,595,637 B2 | 7/2003 | Ahsbahs et al. |
| 6,655,802 B2 | 12/2003 | Zimmermann et al. |
| 6,682,194 B2 | 1/2004 | Ahsbahs et al. |
| 6,796,653 B2 * | 9/2004 | Shirayanagi ................... 351/159 |
| 6,811,260 B2 * | 11/2004 | Yamakaji ...................... 351/177 |
| 2004/0169297 A1 | 9/2004 | Dorsch |

(Continued)

FOREIGN PATENT DOCUMENTS

FR 2 683 642 5/1993
(Continued)

OTHER PUBLICATIONS

Jalie, "Progressive Lenses Part 2, The New Generation", *Optometry Today / Optics Today*, pp. 35-45 (Jun. 17, 2005).

(Continued)

*Primary Examiner* — James Greece
(74) *Attorney, Agent, or Firm* — Polsinelli Shughart PC (57) ABSTRACT

A method for the determination by optical optimization of a personalized progressive ophthalmic lens intended to be inserted into a frame chosen by a given wearer for whom a power addition has been prescribed in near vision, the method comprising the stages of:
- measuring parameters representing the frame chosen by the wearer;
- choosing an initial distribution of power and resulting astigmatism defect targets for each direction of viewing under wearing conditions in an ordinary frame;
- calculating transformation coefficients using the measured parameters representing the chosen frame and standard parameters;
- calculating a personalized distribution of the power and resulting astigmatism defect targets on the lens by applying the calculated transformation coefficients to the initial distribution.

The method makes it possible to retain the proportion of the distribution between the far-vision, near-vision and intermediate-vision zones whatever the size and the shape of the frame chosen.

14 Claims, 4 Drawing Sheets

U.S. PATENT DOCUMENTS

| | | |
|---|---|---|
| 2005/0146714 A1* | 7/2005 | Kitamura et al. ........... 356/237.2 |
| 2005/0270482 A1* | 12/2005 | Fisher et al. .................. 351/177 |
| 2006/0245636 A1* | 11/2006 | Kitamura et al. ............. 382/149 |
| 2007/0103641 A1 | 5/2007 | Bonnin |

FOREIGN PATENT DOCUMENTS

| | | |
|---|---|---|
| FR | 2 699 294 | 6/1994 |
| FR | 2 704 327 | 10/1994 |
| FR | 2 820 516 | 8/2002 |
| FR | 2 863 857 | 6/2005 |
| GB | 2 277 997 | 11/1994 |
| JP | 2004-163787 | 6/2004 |
| WO | WO 98/12590 | 3/1998 |
| WO | WO 01/88601 | 11/2001 |

OTHER PUBLICATIONS

European Search Report for Application No. EP 07 29 0227, dated May 22, 2007.

European Search Report for Application No. EP 07 29 0226, dated May 22, 2007.

* cited by examiner

METHOD FOR THE DETERMINATION OF A PROGRESSIVE OPHTHALMIC LENS

CROSS REFERENCE TO RELATED APPLICATION

Pursuant to U.S.C. §119, this application claims the benefit of French Patent Application 06 01 810, filed Mar. 1, 2006. The contents of the prior application is incorporated herein by reference in its entirety.

TECHNICAL FIELD

This invention relates to a method for the determination of a progressive ophthalmic lens; in particular a progressive lens personalized for a specific frame chosen by a given wearer.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and the position of the wearer's eyes relative to the frame.

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327.

Progressive multifocal ophthalmic lenses include a far-vision zone, a near-vision zone, an intermediate-vision zone, a principal progression meridian crossing these three zones. They are generally determined by optimization, based on a certain number of constraints imposed on the different characteristics of the lens. Most lenses marketed are all-purpose lenses, in that they are adapted to the different needs of the wearers at the time.

A progressive multifocal lens can be defined by geometric characteristics on at least one of its aspherical surfaces. In order to characterize an aspherical surface the parameters constituted by the minimum and maximum curvatures at each point are conventionally used, or more commonly their half-sum and their difference. This half-sum and this difference multiplied by a factor n−1, n being the refractive index of the lens material, are called mean sphere and cylinder.

Moreover, a progressive multifocal lens can also be defined by optical characteristic taking into account the situation of the wearer of the lenses. In fact, the laws of the optics of ray tracings provide that optical defects appear when the rays deviate from the central axis of any lens. Conventionally, the aberrations known as power defects and astigmatism defects are considered. These optical aberrations can be generically called obliquity defects of rays.

The obliquity defects of rays have already been clearly identified in the prior art and improvements have been proposed. For example, the document WO-A-98 12590 described a method for determination by optimization of a set of progressive multifocal ophthalmic lenses. This document proposes defining the set of lenses by considering the optical characteristic of the lenses and in particular the wearer power and oblique astigmatism, under wearing conditions. The lens is optimized by ray tracing, using an ergorama associating a target object point with each direction of viewing under wearing conditions.

EP-A-0 990 939 also proposes to determine a lens by optimization taking into account the optical characteristics instead of the surface characteristics of the lens. For this purpose the characteristics of an average wearer are considered, in particular as regards the position of the lens in front of the eye of the wearer in terms of curving contour, pantoscopic angle and lens-eye distance.

It has been found that the frame can modify the optical performances perceived by the wearer. In fact, the distribution of the power and resulting astigmatism defects over the lens is generally optimized for a zone of the lens corresponding to an average size of a cut-out lens. Thus, in the case of a large frame, an enlarged peripheral zone can disturb the wearer's visual perception in peripheral vision; and in the case of a small frame, the effective surface of the lens is reduced, which can even lead to a harmful reduction of the near-vision zone. Moreover, the fields perceived by the same wearer are different depending on the width of the frame; dynamic and peripheral vision can be more or less disturbed depending on the size of the frame chosen and the near-vision zone can be more or less present depending on the height of the frame. Recently therefore it has been sought to personalize progressive ophthalmic lenses for the type of frame chosen in order to best satisfy the needs of each wearer.

For example, the applicant proposes, under the trade mark Varilux Ipseo®, a range of progressive ophthalmic lenses having different progression lengths in order to adapt to frames of different heights. When a wearer chooses a frame of low height, a progressive lens having a reduced progression length is chosen for this frame.

Other solutions propose an optimization of the progressive ophthalmic lens as a function of the wearing parameters depending on the frame, taking into account for example the lens-eye distance, the interpupillary distance, the pantoscopic angle, the curving contour of the lens, etc.

For example, documents U.S. Pat. No. 6,655,802 and US-A-2004/0169297 propose to optimize a progressive lens as a function of the cornea-vertex distance measured for a given frame in order to determine an optimal progression length. The U.S. Pat. No. 6,199,983 proposes to personalize a progressive lens as a function of the "life style" of the wearer, for example taking into account the shape of the frame.

It is also proposed in the document U.S. Pat. No. 5,444,503 to take into account the shape of the frame in order to distribute the prismatic effects to the left and to the right of the lens in order to obtain an acceptable "thickness-weight" ratio and in order to disperse the aberrations towards the parts of the lens intended to be trimmed during cutting out.

Nikon® markets under the trade mark Seemax® a unifocal lens optimized as a function of the size and the shape of the frame.

However, none of the known solutions makes it possible to optimize the progressive ophthalmic lens in the entire vision field of the wearer as a function of the frame chosen. In particular, none of the solutions described above makes it possible to retain a constant proportion between the far-vision, near-vision and intermediate-vision zones whatever the frame chosen by the wearer.

A need still exists therefore for a lens which better satisfies the specific needs of each individual wearer.

SUMMARY

The invention consequently proposes taking into account the shape and the size of the frame in order to retain the distribution between the far-vision, near-vision and intermediate-vision zones on the lens. The invention proposes, using a given design of a progressive ophthalmic lens, applying a spatial transformation which retains the power and resulting astigmatism defect values but shifts these values on the surface of the lens in order to spread or close up the power and astigmatism gradients. Thus, in the case of a small frame, the gradients can be closed up in order to guarantee the presence of a minimum surface of the near-vision zone and in the case of a large frame, the gradients can be spread in order to clear the vision fields and in order to improve peripheral vision.

The invention more particularly proposes a method for the determination of a personalized progressive ophthalmic lens intended to be inserted into a frame chosen by a given wearer for whom a near-vision power addition has been prescribed, the method comprising the stages of:

measuring parameters representing the frame chosen by the wearer;

choosing an initial distribution of power and resulting astigmatism defect targets for each direction of viewing under wearing conditions in any frame;

calculating transformation coefficients using the measured parameters representing the chosen frame and standard parameters;

calculating a personalized distribution of the power and resulting astigmatism defect targets on the lens by applying the calculated transformation coefficients to the initial distribution;

calculating the power required on the lens for each direction of viewing by successive iterations in order to obtain the target power defect and the target astigmatism defect.

According to one embodiment, the stage of measuring parameters representing the frame comprises the stages of:

measuring the width of the cut-out lens;

measuring the bridge width of the chosen frame;

measuring the interpupillary distance on the wearer;

measuring the fitting height as the vertical distance between a point of the lens marking the primary direction of viewing under wearing conditions and a given point of the frame;

calculating a horizontal parameter taking into account the width of the cut-out lens, the bridge width and the interpupillary distance measured;

calculating a vertical parameter taking into account the fitting height measured.

According to one embodiment, the stage of calculating transformation coefficients comprises the stages of calculating:

a horizontal coefficient such as the ratio between a horizontal parameter calculated for the frame chosen by the wearer and a standard horizontal parameter;

a vertical coefficient such as the ratio between a vertical parameter calculated for the frame chosen by the wearer and a standard vertical parameter.

According to one embodiment, the stage of calculating transformation coefficients comprises the stages of:

calculating of a vertical coefficient as the ratio between a vertical parameter calculated for the frame chosen by the wearer and a standard vertical parameter;

determining a horizontal coefficient as being set equal to the vertical coefficient.

According to the embodiments, the vertical coefficient is limited to a lower value equal to 0.65 and to an upper value equal to 1.5; the horizontal coefficient is limited to a lower value equal to 0.55 and to an upper value equal to 1.25; the ratio of the vertical coefficient over the horizontal coefficient is limited to a lower value equal to 0.5 and to an upper value equal to 3.

According to one embodiment, the stage of calculating the personalized distribution of the power and resulting astigmatism defect targets on the lens comprises the stages of:

determining a vertical and horizontal mesh associating one point to each direction of viewing under wearing conditions, there being associated with each point of the mesh spherical coordinates of the direction of viewing and power and resulting astigmatism defect values corresponding to the initial distribution chosen for the targets;

at each point of the mesh, applying the calculated transformation coefficients to the spherical coordinates whilst maintaining constant the power and resulting astigmatism defect targets.

According to one embodiment, applying the calculated transformation coefficients to the spherical coordinates consists in multiplying the horizontal angular value by the horizontal coefficient and multiplying the vertical angular value by the vertical coefficient.

According to one embodiment, calculating the personalized distribution of the targets is carried out whilst maintaining constant the ratio of the area of the lens surface for which the resulting astigmatism defect is less than or equal to 0.5 diopters over the total surface of the cut-out lens.

The invention relates to a personalized progressive ophthalmic lens optimized by the method of the invention.

The invention also relates to a visual device comprising a frame chosen by a wearer and at least one lens according to the invention and a method for the correction of the vision of a presbyopic subject, comprising the provision to the subject or the wearing by the subject of a device according to the invention.

DESCRIPTION OF DRAWINGS

Other advantages and features of the invention will become apparent on reading the following description of the embodiments of the invention, given by way of example and with reference to the drawings which show.

DETAILED DESCRIPTION

The invention proposes a method for the determination of a progressive ophthalmic lens for a presbyopic wearer, i.e. for whom a power addition (Add) has been prescribed for near vision. The method of the invention makes it possible to determine a progressive ophthalmic lens guaranteeing for the wearer good accessibility to the near-vision zone and an improved dynamic vision in the entire vision field whatever the type of frame chosen and its prescription.

In a manner known per se, a progressive lens has a far-vision zone with a control point FV, a near-vision zone with a control point NV and an intermediate-vision zone. The lens has a substantially umbilical line, called a principal progression meridian crossing these three zones, over which the astigmatism is practically nil. The meridian coincides with the vertical axis in the upper part of the lens and can have an inclination on the nose side in the lower part of the lens, the convergence being more marked in near vision. The lateral shift of the control point NV relative to the vertical axis of the meridian in the upper part of the lens is called an inset.

The meridian therefore has a power progression between the control point in far vision FV and the control point in near vision NV; this progression corresponds approximately to the value of the addition prescribed. A fitting cross CM is marked by a reference point on the complex surface and constitutes an aid for fitting the cut-out lens into the frame; this fitting cross CM makes it possible to locate on the lens the primary direction of viewing under wearing conditions. In this context, progression length PL refers to the vertical distance between the fitting cross CM and the point of the meridian in near vision NV at which the power progression reaches the prescribed power.

The progression length PL defines the accessibility to the powers necessary in near vision. In fact, the profile of the meridian represents the wearer power as a function of lowering the eyes in the eye sockets with a direction of viewing which is straight ahead. Thus, according to the value of the progression length, the wearer will have to lower his eyes more or less in order to be able to take full advantage of the near-vision zone. With a constant progression length, the near-vision zone can be substantially present on the cut-out lens depending on the size and the shape of the frame.

The present invention proposes taking into account the size and the shape of the frame in order to optimize a progressive ophthalmic lens and to afford optimal visual comfort for the wearer. The consideration of such frame parameters is now possible on an industrial scale thanks to the methods for direct machining of the complex surfaces constituting the progressive lenses.

The invention proposes to determine a progressive ophthalmic lens personalized for the frame chosen by the wearer. For this purpose parameters representing the frame chosen by the wearer are measured as explained below with reference to FIGS. 1 and 2; then an initial design of a progressive lens is chosen. This design establishes an initial distribution of power and resulting astigmatism defect targets for each direction of viewing under wearing conditions in a standard size frame. The design chosen can correspond to any design of a known or future progressive lens, for example the initial distribution of the power and resulting astigmatism defect targets can correspond to a Varilux Comfort® or Varilux Panamic® lens.

Figure 1:
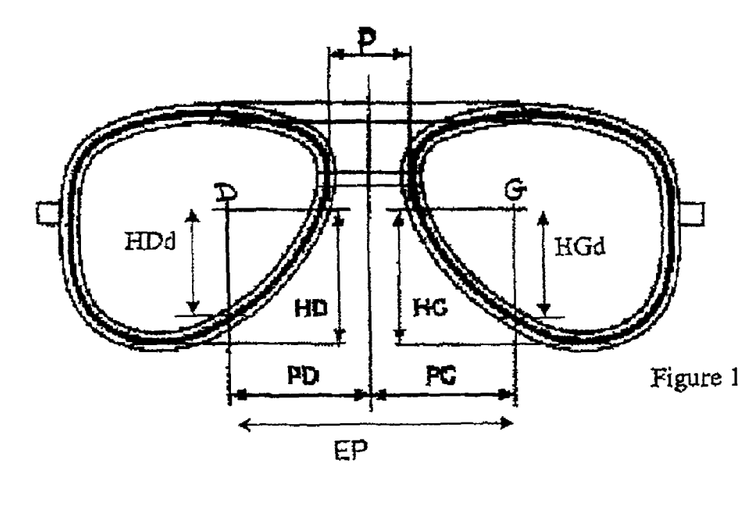
FIG. 1, a diagram of an ordinary frame.
Figure 2:
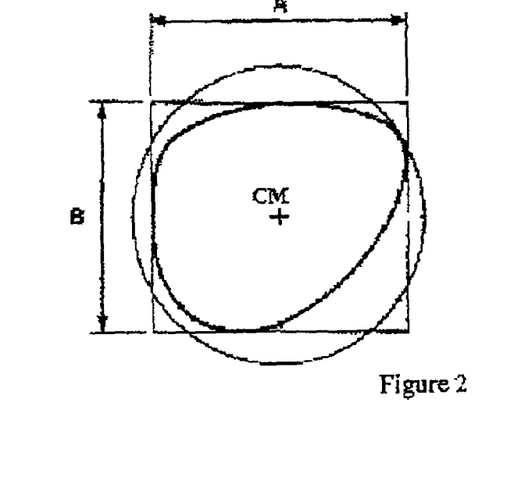
FIG. 2, a diagram of a lens before and after cutting out for insertion into a frame of FIG. 1.

FIG. 1 shows a diagram of a frame and FIG. 2 diagrammatically illustrates a lens before and after cutting out.

The wearer chooses a frame. The optician measures the physiological parameters of the wearer for the chosen frame. FIG. 1 shows a representation of a frame and the position of the right and left pupils of the wearer in the frame, which are respectively referenced D and G. The figure shows for the frame the contour of the lens in thick lines, and in thin lines the internal and external limits of the frame. An element, made of plastic or another material, the contour of which corresponds to the bottom of the groove of the frame, is called the template of the frame. The template is therefore the external shape that the lens must have once cut out in order to fit in the frame. The letter B designates the total height of the template determined with the Boxing system, i.e. according to the IS08624 standard on systems for the measurement of lenses frames. This height corresponds to the height of a rectangle into which the lens fits once it is cut out. In the case of a drilled frame, without any template, it is the height B of the cut-out lens (FIG. 2) which is considered. An element connecting the right and left templates of the frame is called the bridge of the frame, referenced by letter P in FIG. 1. The bridge P can also be a rod connecting drilled right and left lenses.

Interpupillary distance EP refers to the distance between the two pupils of the wearer. For the fitting of progressive lenses, an optician measures the right interpupillary half-distance and the left interpupillary half-distance, which are referenced PD and PG. The left half-distance (respectively right) is the distance between the vertical axis of symmetry of the frame and the centre of the left pupil (respectively right). Right boxing height HD (respectively left boxing height HG) refers to the vertical distance between the right pupil (respectively left) and the lowest point of the right half-frame (respectively left height). For the fitting of progressive lenses, the optician then measures the DATUM heights referenced HDd and HGd in FIG. 1. These right and left reference heights are respectively the distances between the right or left pupil and the right or left intersection between a vertical line passing through the pupil and the frame in its lower part. The measurements of interpupillary distance and of height of the pupil relative to the frame are carried out for a given position of the wearer, namely for the wearer looking at infinity with his head straight.

The features of a given frame can be measured on the frame, using a device known per se. By way of example, U.S. Pat. No. 5,333,412 describes a device which makes it possible to measure in 3-dimensions, the shape of the bottom of the groove of the frame. The shape thus determined then makes it possible to calculate the height B. The features of a frame can also be given directly by the manufacturer according to the model chosen by the wearer.

Using the data thus defined, each lens is cut out such that the fitting cross CM is situated in the frame facing the pupil of the corresponding eye, when the wearer looks at infinity with his head straight. Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

FIG. 2 shows a representation of the contour of an ophthalmic lens, before and after cutting out. In the figure, the thin line corresponds to the contour of the lens before cutting out; in a standard manner, the lens can be obtained by moulding and has a circular shape. The thick line corresponds to the contour of the template of the frame, which is also the contour of the lens after cutting out the lens. This cutting out of the lens allows the subsequent fitting of the lens in the frame.

FIG. 2 shows the total width A of the template of the frame and the total height B of this template, i.e. the width and the height of the rectangle into which the cut-out lens fits. As explained above, the positioning of the lens in the frame consists in determining the desired position of the lens in the frame, using notable points of the lens. For example, the fitting cross of the lens, the medium of micro-marks marked on the surface of the lens, or also the optical centre in the case of a unifocal lens can be used. In FIG. 2, the fitting cross is marked by the cross referenced CM. For a lens which does not have a rotational symmetry, it is also necessary to carry out an angular positioning of the lens in the frame. This angular positioning depends on the manufacturer's specifications, and in particular for progressive lenses on the behaviour of the principal progression meridian; in the progressive lenses of the applicant, the principal progression meridian is inclined on the temporal side towards the nose side, and the lens must be fitted in such a way that the micro-marks are horizontal. In the state of the art lenses have also been proposed having a straight principal progression meridian, which are inclined towards the nose side when fitting.

A given frame, chosen by a given wearer, can thus be characterized by a certain number of parameters representing its size and its shape. Notably, it is possible to define a vertical parameter, referenced B', depending on the fitting height measured HD, HG or HDd, HGd according to the measurement system chosen. For example it is possible to use as vertical parameter B', the measured variable HD (HG). It is also possible to define a horizontal parameter taking into account the total width A of the template of the frame (or of the cut-out lens), the width of the bridge P and the interpupillary distance measured EP. For example it is possible to use as horizontal parameter A', the variable defined as follows:

$$A' = A + 0.5*(P-EP).$$

This variable can be calculated for each eye:

$$A'd = A + 0.5*P - PD;\text{ and}$$

$$A'g = A + 0.5*P - PG$$

In this context, standard parameters are defined as the average value of the horizontal and vertical parameters as defined above for a representative sample of frames and for the average of wearers. According to the definitions of the parameters given above, a standard vertical parameter $B'_{av}$ would be equal to the average fitting height value $HD_{av}$, equal to 21.6 mm. This average fitting height value is calculated from 5600 prescriptions collected between November 2003 and April 2004 in Europe. Similarly, a standard horizontal parameter $A'_{av}$ would be defined as follows:

$$A'_{av} = A_{av} + 0.5*(P_{av} - EP_{av}).$$

With $A_{av}$, the average width of frame template, equal to 51.6 mm, this being calculated from 5600 prescriptions collected between November 2003 and April 2004 in Europe;

$P_{av}$, the average length of a bridge of a frame, equal to 18.4 mm, this being calculated using 5600 prescriptions collected between November 2003 and April 2004 in Europe;

$EP_{av}$, the average interpupillary distance, generally set at 62 mm.

From the frame chosen by the wearer, transformation coefficients are then calculated. The calculation of these transformation coefficients takes into account the parameters measured representing the frame chosen and standard parameters as defined above.

According to one embodiment, the transformation coefficients include a horizontal coefficient $\gamma$ and a vertical coefficient $\delta$. The vertical transformation coefficient $\delta$ can be defined as the ratio between the vertical parameter B' calculated for the frame chosen by the wearer and the standard vertical parameter $B'_{av}$. Similarly the horizontal transformation coefficient $\gamma$ can be defined as the ratio between the horizontal parameter A' calculated for the frame chosen by the wearer and the standard horizontal parameter $A'_{av}$.

According to one embodiment, only the vertical transformation coefficient $\delta$ can be calculated and the horizontal coefficient $\gamma$ is then set equal to the vertical coefficient $\delta$. This embodiment makes it possible to limit the distortions of the design of the lens by applying a symmetrical spatial transformation to the distribution of the power and resulting astigmatism defect targets on the lens personalized for the chosen frame. The vertical transformation coefficient $\delta$ makes it possible to adapt the design of the lens to the height of the frame chosen and in particular to guarantee the presence of a minimal near-vision zone.

The vertical $\delta$ and/or horizontal $\gamma$ transformation coefficients can be limited in order to avoid too high or too low a gradient of resulting astigmatism which would lead to a reduced field effect or to an increased pitching effect. For example, the vertical transformation coefficient $\delta$ can be limited to a lower value equal to 0.65 and to an upper value equal to 1.5. The lower limit of the vertical transformation coefficient $\delta$ is set by a physical limit which corresponds to a minimum achievable progression length value. The upper limit of this coefficient is in particular imposed by the necessity to not extend the progression length too much in order to preserve good accessibility to the near-vision zone. This limitation is "mechanical", due to the eye lids and corresponds to a maximum lowering of viewing with a fixed head. Similarly, the horizontal transformation coefficient $\gamma$ can be limited to a lower value equal to 0.5 which ensures the preservation of a minimal acuity zone, and to an upper value equal to 1.25. This upper limit corresponds to the maximal temporal rotation of the eyes; this is also a "mechanical" limit. In the above-mentioned embodiment according to which the horizontal and vertical transformation coefficients are not set equal, the ratio $\delta/\gamma$ of the vertical coefficient $\delta$ to the horizontal coefficient $\gamma$ is limited to a lower value equal to 0.5 and to an upper value equal to 3.0 in order to avoid too large distortions of the distribution of the power and resulting astigmatism defect targets.

A personalized distribution of the power and resulting astigmatism defect targets can then be calculated in order to optimize the lens intended for the frame chosen by the wearer. The transformation coefficients calculated as explained above are applied to the initial distribution chosen for the power and resulting astigmatism defect targets in order to spatially shift these targets in order to adapt the design chosen to the size and shape of the frame. The transformation coefficients $\gamma$ and $\delta$ are applied to the coordinates of the targets on the surface of the lens and not to the values of the targets. The design chosen therefore undergoes a compression or an expansion depending on whether the frame chosen is smaller or larger than that of a standard frame. The determination method of the invention proposes applying a spatial transformation to a given design for distribution of the power and resulting astigmatism defect targets, the transformation ratio being a function of the size and the shape of the frame chosen relative to standard frame parameters. The design is therefore not modified but simply expanded or compressed, in particular the values of the targets are not recalculated but simply shifted spatially on the surface of the lens.

The calculation of the personalized distribution of the power and resulting astigmatism defect targets on the lens intended for the frame chosen by the wearer can be carried out in the following way. A vertical and horizontal mesh is defined by associating a point to each direction of viewing under wearing conditions. Spherical coordinates ($\beta$, $\alpha$) corresponding to the intersection of a line of viewing on the aspherical surface of the lens for each direction of viewing are associated with each point of this mesh. A power defect value and a resulting astigmatism value corresponding to the initial distribution chosen for the targets are also associated with each point of the mesh. The transformation coefficients γ and δ are then applied to each point of the mesh thus defined; the spherical coordinates of each point are recalculated by multiplying the angular value β and/or α by the corresponding homothetic coefficient γ and/or δ and by maintaining the power and resulting astigmatism defect target values constant. For example, the application of the calculated transformation coefficients γ, δ to the spherical coordinates (β, α) can consist in multiplying the vertical angular value α by the vertical transformation coefficient δ, and multiplying the horizontal angular value (β-βmer) by the horizontal transformation coefficient γ, βmer being for a given α the value of the abscissa of the point on the meridian. In this way the inset VP is not modified by the transformation.

In addition to the limits imposed on the values of the horizontal γ and vertical δ transformation coefficients, as described above, it is also possible to impose, during calculation of the personalized distribution of the targets, maintaining constant the ratio of the area of the surface of the lens for which the resulting astigmatism defect is less than or equal to 0.5 diopters over the total surface of the cut-out lens. Thus a constant proportion of the distribution between the far-vision, near-vision and intermediate-vision zones is guaranteed whatever the size and the shape of the frame chosen by the wearer.

Figure 3A:
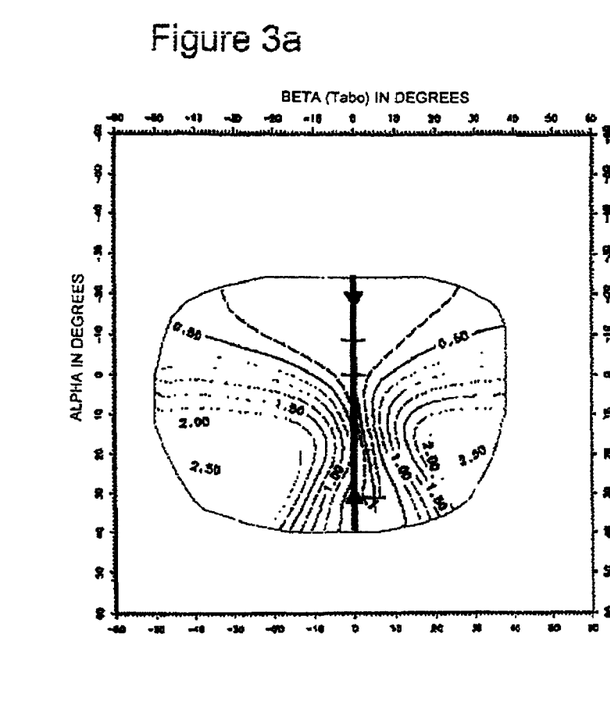
FIGS. 3a and 3b, maps of resulting astigmatism for a lens of the prior art and for a lens according to a first embodiment of the invention respectively.
Figure 3B:
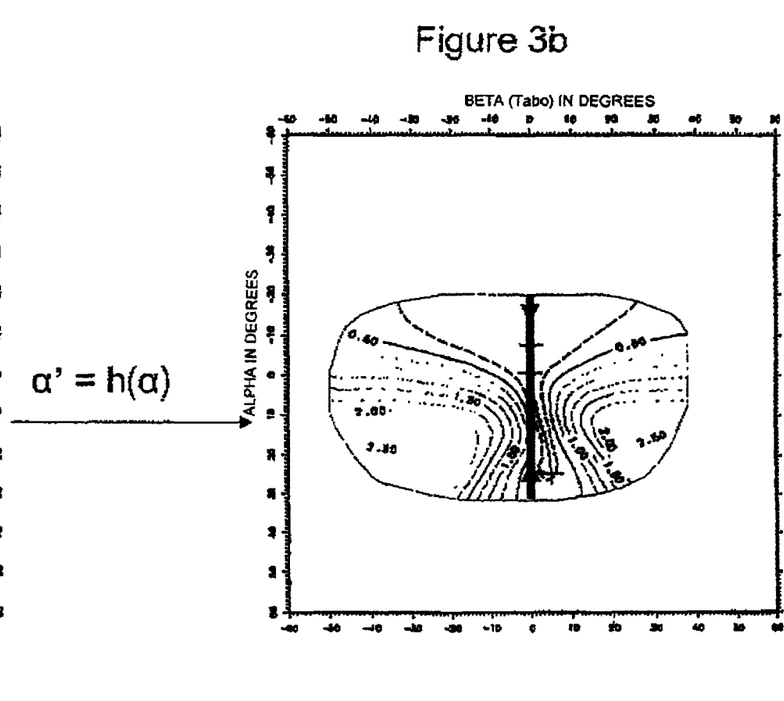

FIGS. 3a and 3b show one embodiment of a progressive ophthalmic lens determined by the method of the invention. FIG. 3a shows an all-purpose cut-out lens having a distribution of resulting astigmatism targets determined under wearing conditions with standard wearer and frame parameters. FIG. 3b shows a cut-out lens specifically adapted for the choice of a frame of low height. The distribution of the resulting astigmatism targets on the lens of FIG. 3b is defined by affinity of the horizontal axis and vertical direction of the initial distribution of FIG. 3a. A vertical compression coefficient δ (affinity ratio) is applied to each point (β, α) of the initial lens which shifts the value of the resulting astigmatism towards another point (β, α') of the personalized lens. Such a vertical compression in particular guarantees that the near-vision zone is in fact present on the lens even when the wearer chooses a frame with a very small height.

Figure 4A:
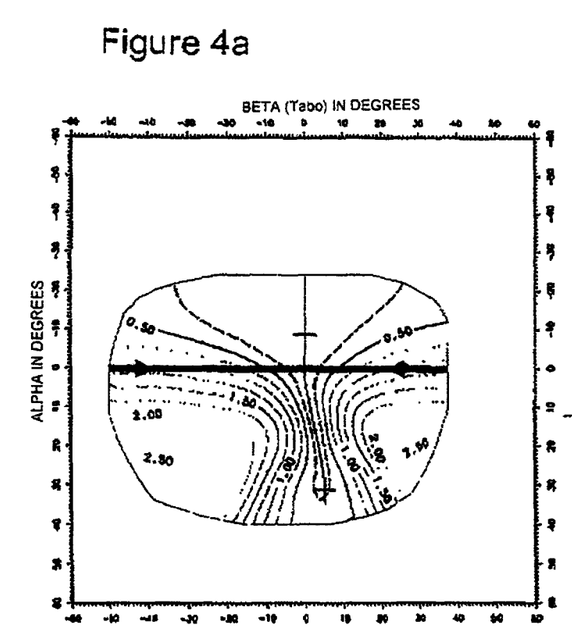
FIGS. 4a and 4b, maps of resulting astigmatism for a lens of the prior art and for a lens according to a second embodiment of the invention respectively.
Figure 4B:
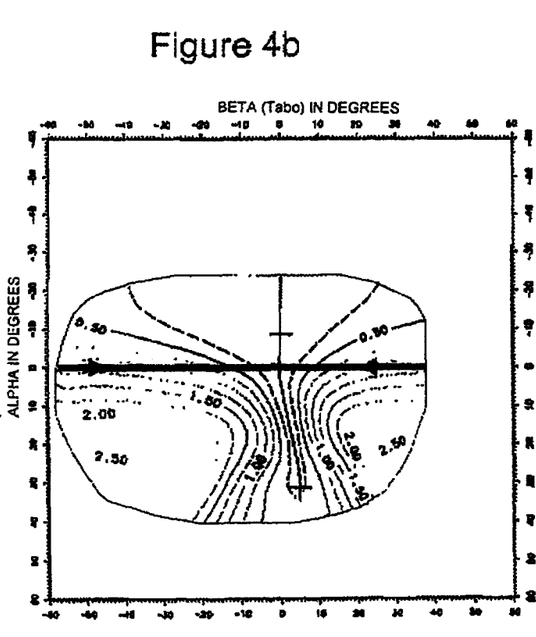

FIGS. 4a and 4b show another embodiment of a progressive ophthalmic lens determined by the method of the invention. FIG. 4a shows the all-purpose cut-out lens of FIG. 3a and FIG. 4b shows a cut-out lens specifically adapted for the choice of a wide frame. The distribution of the resulting astigmatism targets on the lens of FIG. 4b is then defined by horizontal transformation of the initial distribution of FIG. 4a. At each point (β, α) of the initial lens a horizontal expansion coefficient γ is applied which shifts the value of the resulting astigmatism towards another point (β', α) of the personalized lens. Such a horizontal expansion provides a broader field perception for an improved peripheral vision when the wearer chooses a very wide frame.

Figure 5A:
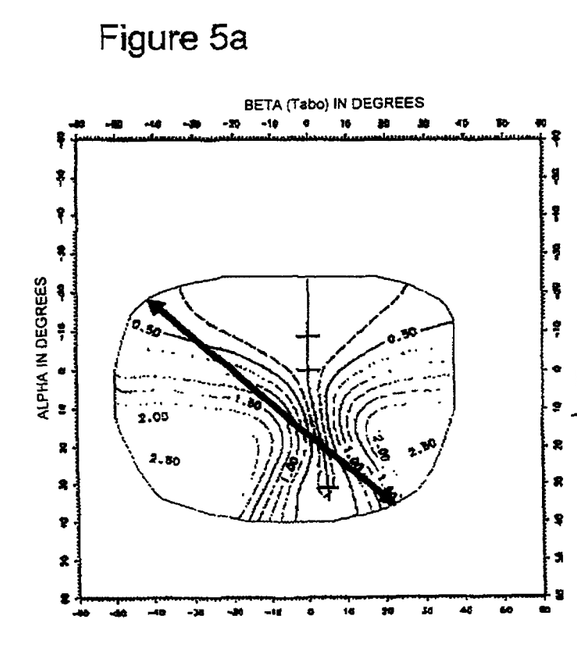
FIGS. 5a and 5b, maps of resulting astigmatism for a lens of the prior art and for a lens according to a third embodiment of the invention respectively.
Figure 5B:
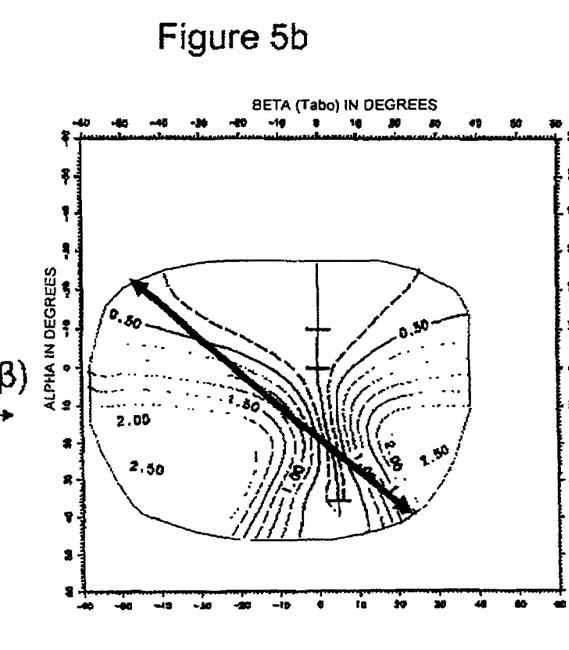

FIGS. 5a and 5b show another embodiment of a progressive ophthalmic lens determined by the method of the invention. FIG. 5a shows the all-purpose cut-out lens of FIGS. 3a and 4a and FIG. 5b shows a cut-out lens specifically adapted for the choice of a frame with large dimensions. The distribution of the resulting astigmatism targets on the lens of FIG. 5b is then defined by horizontal and vertical transformation of the initial distribution of FIG. 5a. At each point (β, α) of the initial lens a horizontal expansion coefficient γ and a vertical expansion coefficient δ are applied which shift the value of the resulting astigmatism towards another point (β', α') of the personalized lens. Such a two-dimensional expansion provides a broader field perception for an improved peripheral vision and clears the fields in far vision or an improved dynamic vision when the wearer chooses a frame with very large dimensions.

Although only the resulting astigmatism maps are illustrated, it is understood that the method of the invention also determines a personalized distribution of the power defect targets at the same time as the personalized distribution of the resulting astigmatism. It is also understood that the method of the invention allows other embodiments than those illustrated, for example a two-dimensional compression.

The method of the invention therefore makes it possible to determine a progressive ophthalmic lens by optical optimization using the distribution of the targets calculated as a function of the frame chosen by the wearer. The power required at each point of the lens can then be calculated by optical optimization under wearing conditions, by successive iterations in order to obtain the target power defect and the target astigmatism defect for each direction of viewing.

The lens according to the invention, thus obtained, therefore better satisfies the needs of the wearer and provides him with better visual comfort.

What is claimed is:

1. A method of making a personalized progressive ophthalmic lens intended to be inserted into a frame chosen by a given wearer having an interpupillary width, and for whom a power addition has been prescribed in near-vision, the method comprising the stages of:

measuring parameters representing the frame chosen by the wearer, the chosen frame having a bridge with a width measurement;

choosing an initial lens design having an initial distribution of power and resulting astigmatism defect targets for each direction of viewing under wearing conditions in an ordinary frame;

defining a working lens to be equal to the initial lens design;

calculating transformation coefficients using the measured parameters representing the chosen frame and standard parameters;

calculating a personalized distribution of the power and resulting astigmatism defect targets on the lens by applying the calculated transformation coefficients to the initial distribution;

defining a personalized progressive ophthalmic lens having the calculated personalized distribution of the power and resulting astigmatism defect targets;

modifying the initial lens design by calculating the power required on the lens for each direction of viewing by successive iterations in order to obtain the target power defect and the target astigmatism defect of the personalized progressive ophthalmic cut-out lens; and producing the personalized progressive ophthalmic lens.

2. The method of claim 1, wherein the personal progressive ophthalmic lens is a cut-out lens, in which the stage of measuring parameters representing the frame comprises the stages of:

measuring the width (A) of the cut-out lens;
measuring the width of the bridge (P) of the chosen frame;
measuring the interpupillary distance of the wearer (EP);
measuring a fitting height (HD, HG, HDg, HGd), defined as the vertical distance between a point of the lens (CM) marking the primary direction of viewing under wearing conditions and a given point of the frame;

calculating a horizontal parameter (A') taking into account the width of the cut-out lens, the bridge width and the interpupillary distance measured;

calculating a vertical parameter (B') taking into account the fitting height measured.

3. The method of claim 1 or 2, in which the stage of calculating transformation coefficients comprises the stages of calculating:

a horizontal coefficient ($\gamma$) such as the ratio between a horizontal parameter (A') calculated for the frame chosen by the wearer and a standard horizontal parameter ($A'_{av}$);

a vertical coefficient ($\delta$) such as the ratio between a vertical parameter (B') calculated for the frame chosen by the wearer and a standard vertical parameter ($B'_{av}$).

4. The method of claim 1 or 2, in which the stage of calculation of transformation coefficients comprises the stages of:

calculating a vertical coefficient ($\delta$) such as the ratio between a vertical parameter (B') calculated for the frame chosen by the wearer and a standard vertical parameter ($B'_{av}$);

determining a horizontal coefficient ($\gamma$) set as being set equal to the vertical coefficient ($\delta$).

5. The method of claim 3, in which the vertical coefficient ($\delta$) is limited to a lower value equal to 0.65 and to an upper value equal to 1.5.

6. The method of claim 3, in which the horizontal coefficient ($\gamma$) is limited to a lower value equal to 0.55 and to an upper value equal to 1.25.

7. The method of claim 3, in which the ratio ($\delta/\gamma$) of the vertical coefficient ($\delta$) over the horizontal coefficient ($\gamma$) is limited to a lower value equal to 0.5 and to an upper value equal to 3.0.

8. The method of claim 1, in which the stage of calculating the personalized distribution of the power and resulting astigmatism defect targets on the lens comprises the stages of:

determining a vertical and horizontal mesh associating a point to each direction of viewing under wearing conditions, there being associated with each point of the mesh spherical coordinates ($\beta$, $\alpha$) of the direction of viewing and power and resulting astigmatism defect values corresponding to the initial distribution chosen for the targets;

at each point of the mesh, applying the transformation coefficients calculated to the spherical coordinates ($\beta$, $\alpha$) maintaining the power and resulting astigmatism defect target values constant.

9. The method of claim 8, in which applying the transformation coefficients calculated ($\gamma$, $\delta$) to the spherical coordinates ($\beta$, $\alpha$) consists in multiplying the horizontal angular value ($\beta$) by the horizontal coefficient ($\gamma$) and multiplying the vertical angular value ($\alpha$) by the vertical coefficient ($\delta$).

10. The method of claim 8 or 9, in which calculating the personalized distribution of the targets is carried out whilst maintaining constant the ratio of the area of the lens surface for which the resulting astigmatism defect is less than or equal to 0.5 diopters over the total surface of the cut-out lens.

11. A personalized progressive ophthalmic lens optimized by the determination method of claim 1.

12. A visual device comprising a frame chosen by a wearer and at least one personalized progressive ophthalmic lens, said lens comprising, under wearing conditions, a power defect distribution and a resulting astigmatism distribution in one or more of a far-vision zone, a near-vision zone, and an intermediate-vision zone depending on parameters representing the frame chosen by the wearer.

13. A method for correcting the vision of a presbyopic subject, which comprises providing the subject with, or the wearing by the subject of, a device according to claim 12.

14. The method of claim 4, in which the vertical coefficient ($\delta$) is limited to a lower value equal to 0.65 and to an upper value equal to 1.5.

* * * * *